United States Patent
Ishida

(10) Patent No.: US 9,560,236 B2
(45) Date of Patent: Jan. 31, 2017

(54) IMAGE READING APPARATUS, CONTROL METHOD, STORAGE MEDIUM, AND SYSTEM

(71) Applicant: CANON KABUSHIKI KAISHA, Tokyo (JP)

(72) Inventor: Tomoya Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/679,983

(22) Filed: Apr. 6, 2015

(65) Prior Publication Data

US 2015/0288843 A1    Oct. 8, 2015

(30) Foreign Application Priority Data

Apr. 7, 2014  (JP) .................. 2014-079004

(51) Int. Cl.
    *H04N 1/203* (2006.01)
    *H04N 1/32* (2006.01)
(52) U.S. Cl.
    CPC .......... *H04N 1/2032* (2013.01); *H04N 1/3248* (2013.01)
(58) Field of Classification Search
    CPC combination set(s) only.
    See application file for complete search history.

(56) References Cited

U.S. PATENT DOCUMENTS

2005/0157934 A1*  7/2005  Tanabe .................. H04N 19/70
                                                         382/232

FOREIGN PATENT DOCUMENTS

JP        2003-324611 A     11/2003

* cited by examiner

*Primary Examiner* — Christopher D Wait
(74) *Attorney, Agent, or Firm* — Canon USA, Inc. I.P. Division

(57) ABSTRACT

An image reading apparatus having a front surface reading unit for reading a front surface of a document and a back surface reading unit for reading a back surface of the document performs adjustment processing in such a manner that start positions of the obtained image data of the front surface and the back surface are each at a position corresponding to an integer multiple of a coding block, and encodes front-and-back combined image data that is based on the adjusted image data of the front surface and the back surface. The image reading apparatus then transmits the encoded front-and-back combined image data, first position information indicating an end edge of the image data of the front surface in the front-and-back combined image data, and second position information indicating an end edge of the image data of the back surface in the front-and-back combined image data.

16 Claims, 17 Drawing Sheets

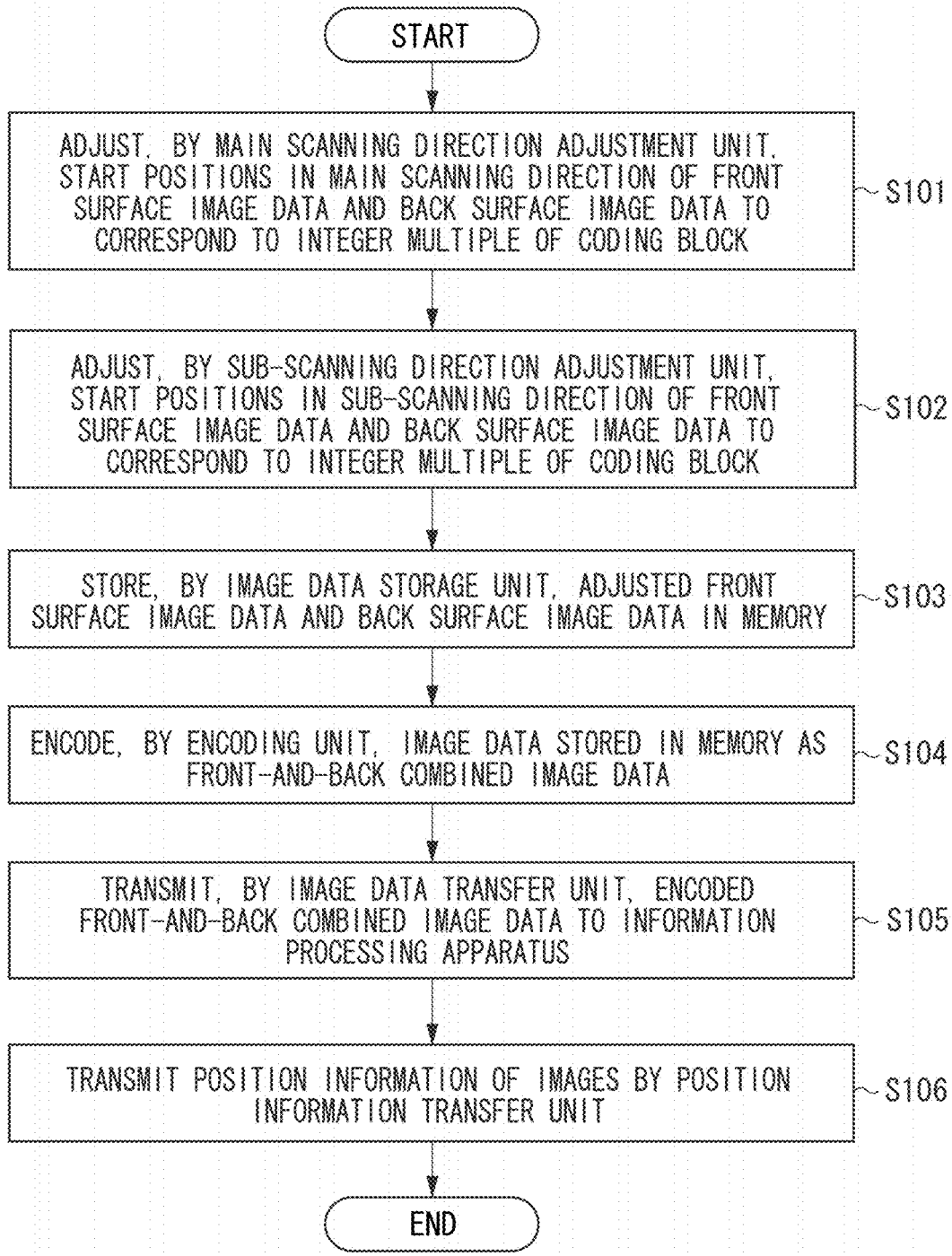

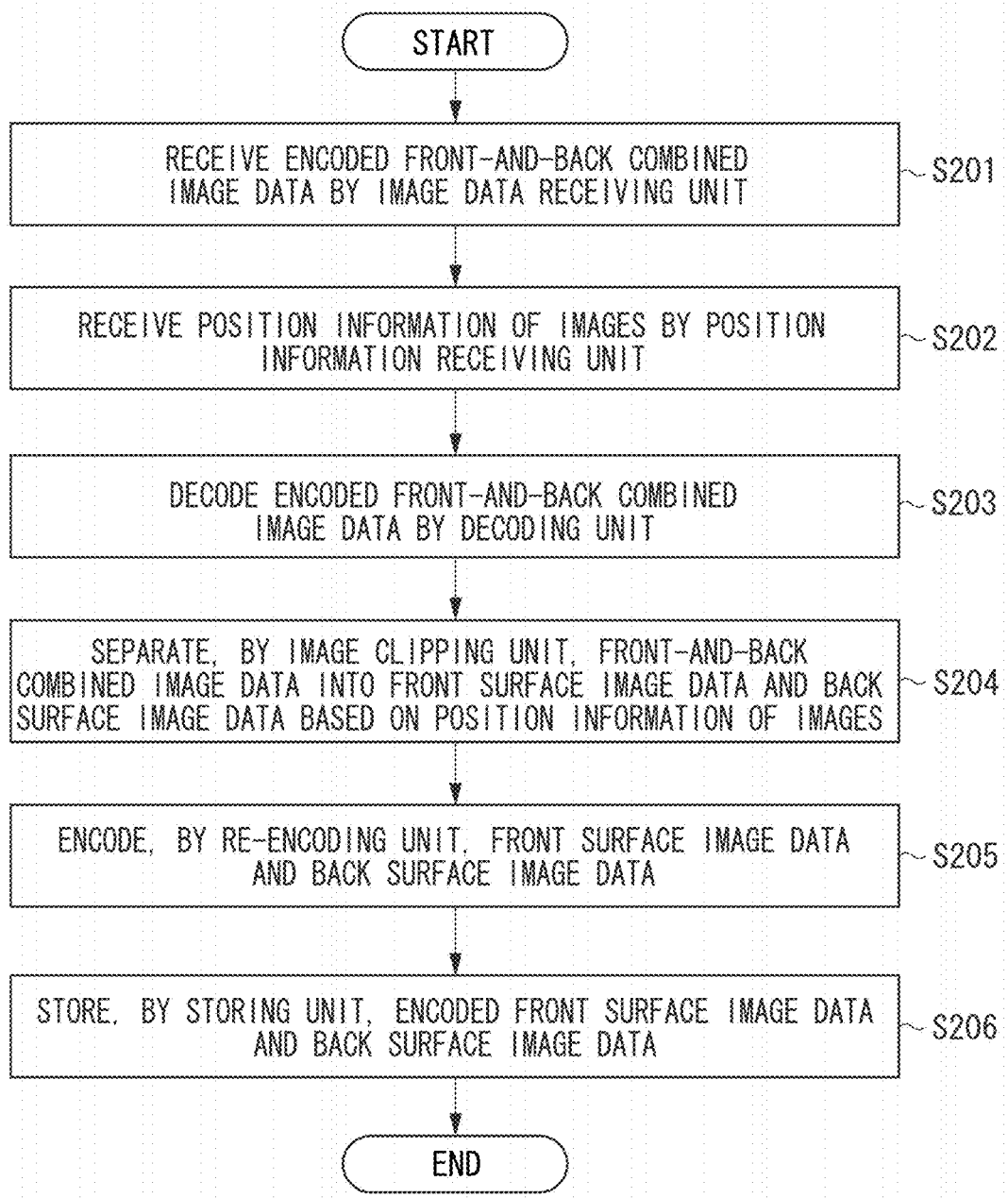

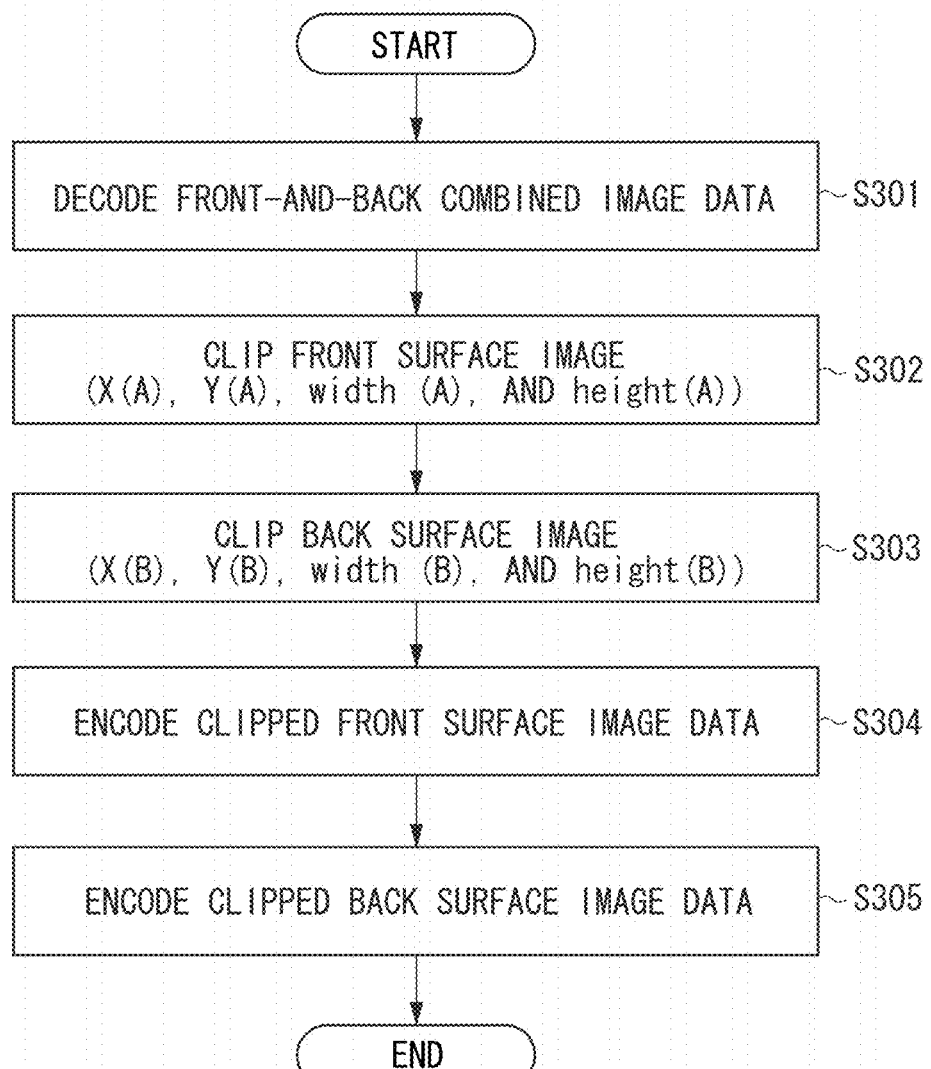

IMAGE READING APPARATUS, CONTROL METHOD, STORAGE MEDIUM, AND SYSTEM

BACKGROUND OF THE INVENTION

Field of the Invention

The present invention relates to an image reading apparatus, a control method, a storage medium, and a system for reading images respectively arranged on a front surface and a back surface of a document through one conveyance, and generating front-and-back combined image data.

Description of the Related Art

Japanese Patent Application Laid-Open No. 2003-324611 discusses an image reading apparatus capable of reading the front surface and the back surface of one sheet of a document at the same time. More specifically, Japanese Patent Application Laid-Open No. 2003-324611 discusses encoding the image data obtained by reading the front surface and the back surface at the same time, as the image data in which the front surface image data and the back surface image data are combined (hereinafter referred to as front-and-back combined image data). In such a case, an identifier is inserted after a coding block of the front surface, and an information processing apparatus separates the front surface and the back surface based on the identifier.

In the technique discussed in Japanese Patent Application Laid-Open No. 2003-324611, the information processing apparatus separates the front-and-back combined image data into the image data of the front surface and the image data of the back surface based on the identifier inserted after the coding block of the front surface. As a result, if an end edge in a width direction of the image data of the front surface is not at a position corresponding to an integer multiple of the coding block, the following may occur. A blank area from the end edge in the width direction of the image data to the position corresponding to the integer multiple of the coding block, at which the identifier is inserted, may be included in the front surface image data after the separation.

SUMMARY OF THE INVENTION

According to an aspect of the present invention, an image reading apparatus having a front surface reading unit configured to read a front surface of a document and a back surface reading unit configured to read a back surface of the document, includes an obtaining unit configured to obtain image data of the front surface of the document that is output from the front surface reading unit and image data of the back surface of the document that is output from the back surface reading unit, an adjustment unit configured to perform adjustment processing in such a manner that a start position of the obtained image data of the front surface and a start position of the obtained image data of the back surface are each at a position corresponding to an integer multiple of a coding block, an encoding unit configured to encode front-and-back combined image data that is based on the adjusted image data of the front surface and the adjusted image data of the back surface, and a transmission unit configured to transmit the encoded front-and-back combined image data, first position information indicating an end edge of the image data of the front surface in the front-and-back combined image data, and second position information indicating an end edge of the image data of the back surface in the front-and-back combined image data.

Further features of the present invention will become apparent from the following description of exemplary embodiments with reference to the attached drawings.

BRIEF DESCRIPTION OF THE DRAWINGS

FIG. 4 is a flowchart illustrating a process performed by the image reading apparatus.

FIG. 5 is a flowchart illustrating a process performed by the information processing apparatus.

FIG. 7 is a flowchart illustrating a process for separating the front-and-back combined image data according to the first exemplary embodiment.

DESCRIPTION OF THE EMBODIMENTS

Various exemplary embodiments, features, and aspects of the invention will be described in detail below with reference to the drawings. It is to be understood that the following exemplary embodiments are not intended to limit the scope of the invention set forth in the appended claims and that all combinations of features described in the exemplary embodiments are not necessarily essential to the technical solution provided by the present invention.

Figure 1:
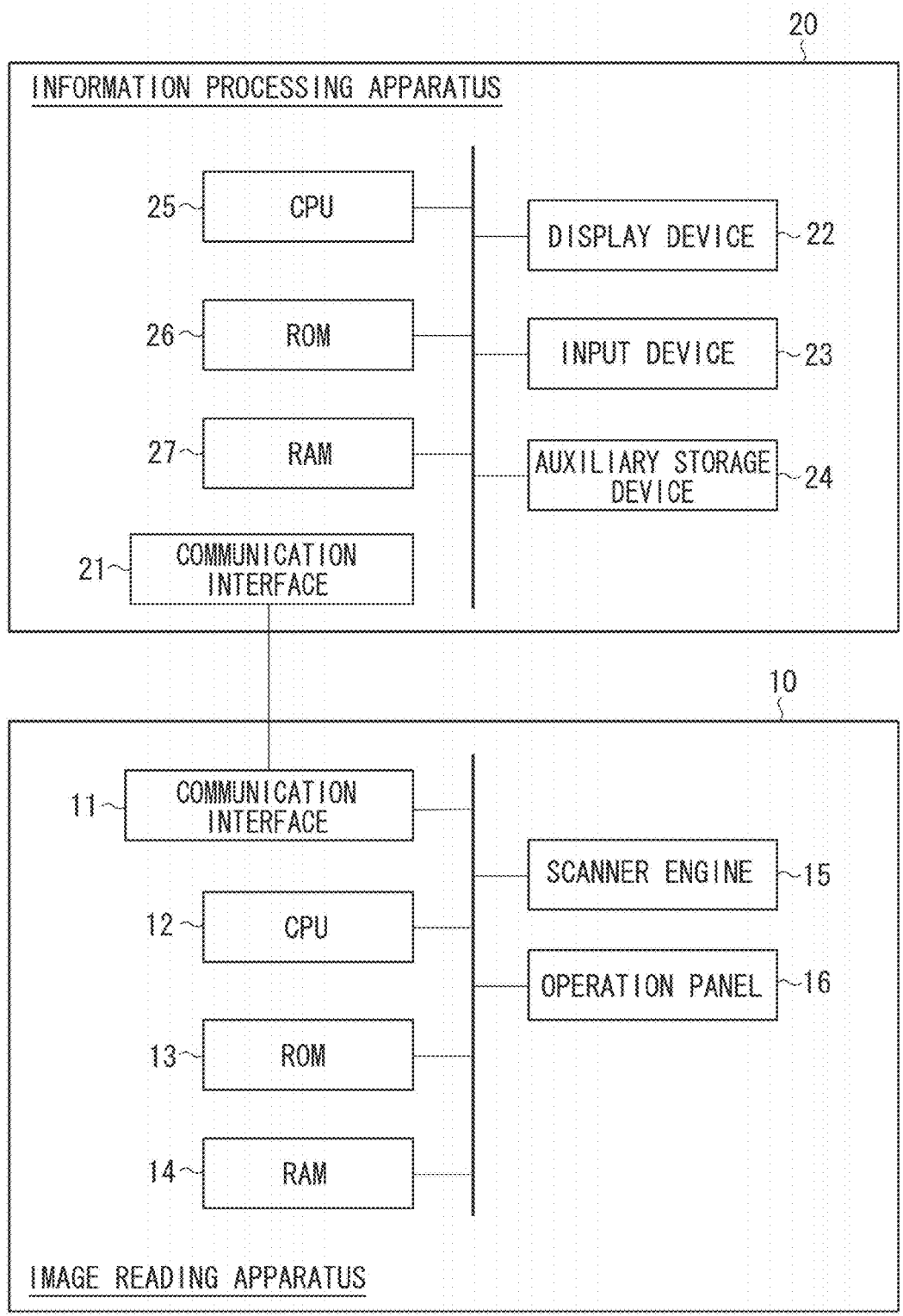
FIG. 1 illustrates an overall configuration of a system.

FIG. 1 illustrates a hardware configuration of an information processing system according to a first exemplary embodiment. The information processing system according to the present exemplary embodiment includes an information processing apparatus 20 and an image reading apparatus 10. The information processing apparatus 20 (hereinafter also referred to as the computer 20) issues an operation command (i.e., a read instruction) to the image reading apparatus 10 and obtains image data read by the image reading apparatus 10. The computer 20 includes, as hardware resources, a communication interface 21, a display device 22, an input device 23, an auxiliary storage device 24, a central processing unit (CPU) 25, a read-only memory (ROM) 26, and a random access memory (RAM) 27. The computer 20 may be a general-purpose personal computer. The communication interface 21 transmits and receives data to and from a peripheral device via a network. The display device 22 displays, based on software installed in the computer 20, various types of information such as various user interfaces (UIs) for operating the image reading apparatus 10. The input device 23 is implemented as, for example, a keyboard and a pointing device, and inputs information indicating an operation by a user. The auxiliary storage device 24 is implemented as, for example, an internal or an external hard disk, and stores various types of information related to the operation performed by the image reading apparatus 10, such as a control program of the image reading apparatus 10. The CPU 25 loads into the RAM 27 and executes various programs stored in the auxiliary storage device 24 and the ROM 26 and thus controls the operations of the computer 20. The ROM 26 stores various programs and various types of information for operating the computer 20. For example, the ROM 26 stores basic software such as a basic input/output system (BIOS). The RAM 27 is used as a work area of the CPU 25 and temporarily stores software and various types of information. The image reading apparatus 10 includes, as hardware resources, a communication interface 11, a CPU 12, a ROM 13, a RAM 14, a scanner engine 15, and an operation panel 16. The communication interface 11 transmits and receives data to and from the computer 20 via a network. The CPU 12 loads into the RAM 14 and executes a control program of the image reading apparatus 10 that is stored in the ROM 13 and thus controls the operations of the image reading apparatus 10. The ROM 13 stores control programs as well as parameters necessary for operating the image reading apparatus 10. The RAM 14 is used as a work area of the CPU 12, and also used as a temporary storage area for status information of the image reading apparatus 10 and image data. The scanner engine 15 includes a light source for irradiating a document with light and a charge-coupled device (CCD) color image sensor for reading reflected light from the document and photoelectrically converting the light. The scanner engine 15 scans the document placed on a platen of the image reading apparatus 10 and reads the image on the document, so that the image data according to the read image is generated. The operation panel 16 includes a display unit for displaying the status of the image reading apparatus 10 and menus for the user performing operations, and hardware keys for the user performing various operations including a read start instruction. The operation panel 16 may be a touch panel or other types of panels. According to the present exemplary embodiment, the image reading apparatus 10 is a dedicated scanner. However, the image reading apparatus 10 may be a multifunction apparatus including other functions such as a printer, in addition to the scanner function. Further, when the image reading apparatus 10 reads the image on the document, the document is placed on the platen and scanned. However, the image reading apparatus 10 may include a document conveying mechanism so that the document is scanned by fixing the scanner engine 15 and the document conveying mechanism conveying the document. Further, the operation performed on the image reading apparatus 10 for starting reading may not be performed by using the operation panel 16. For example, when it is detected that a document to be read has been set on the image reading apparatus 10, the computer 20 may be notified of the fact. Further, it is not necessary for the image reading apparatus 10 to include the CPU 12, and the scanner engine 15 may be operated by control from the computer 20. Furthermore, the image reading apparatus 10 may be a monochrome scanner or a film scanner for reading films, instead of a color scanner. Moreover, in the information processing system according to the present exemplary embodiment, the computer 20 and the image reading apparatus 10 are connected via the network. However, the connection method is not limited thereto, and the connection may be established via a universal serial bus (USB) and transmission and reception of data may be performed with a peripheral device according to a USB standard. The image reading apparatus 10 according to the present exemplary embodiment includes an image reading sensor for reading the front surface (i.e., the front surface reading unit) and an image reading sensor for reading the back surface (i.e., the back surface reading unit). As a result, the image reading apparatus 10 is capable of reading the image data on the front surface and the image data on the back surface through one conveying process of the document.

Figure 2:
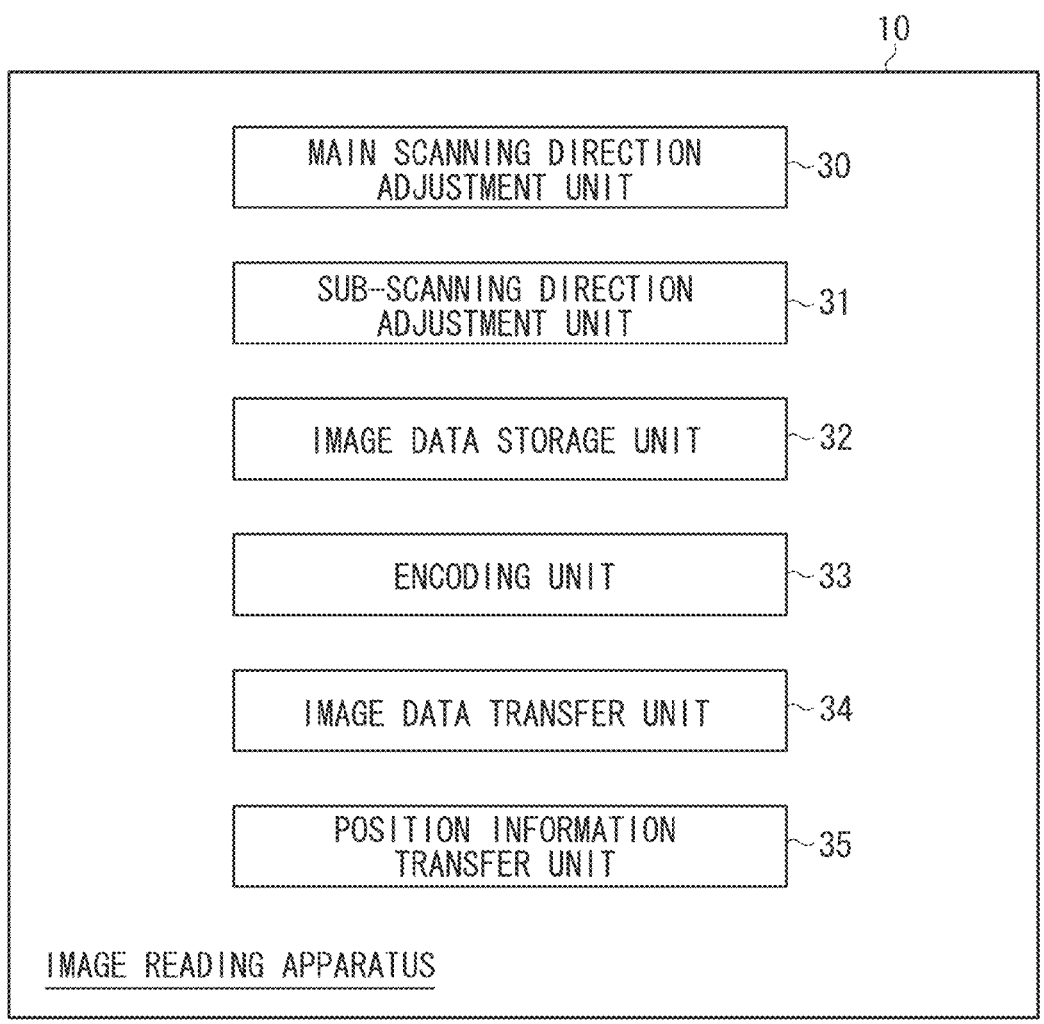
FIG. 2 illustrates units included in an image reading apparatus.

FIG. 2 illustrates units included in the image reading apparatus 10. Referring to FIG. 2, the image reading apparatus 10 includes a main scanning direction adjustment unit 30, a sub-scanning direction adjustment unit 31, an image data storage unit 32, an encoding unit 33, an image data transfer unit 34, and a position information transfer unit 35. The processes performed by the units included in the image reading apparatus 10 will be described in detail below with reference to the flowchart illustrated in FIG. 4.

Figure 3:
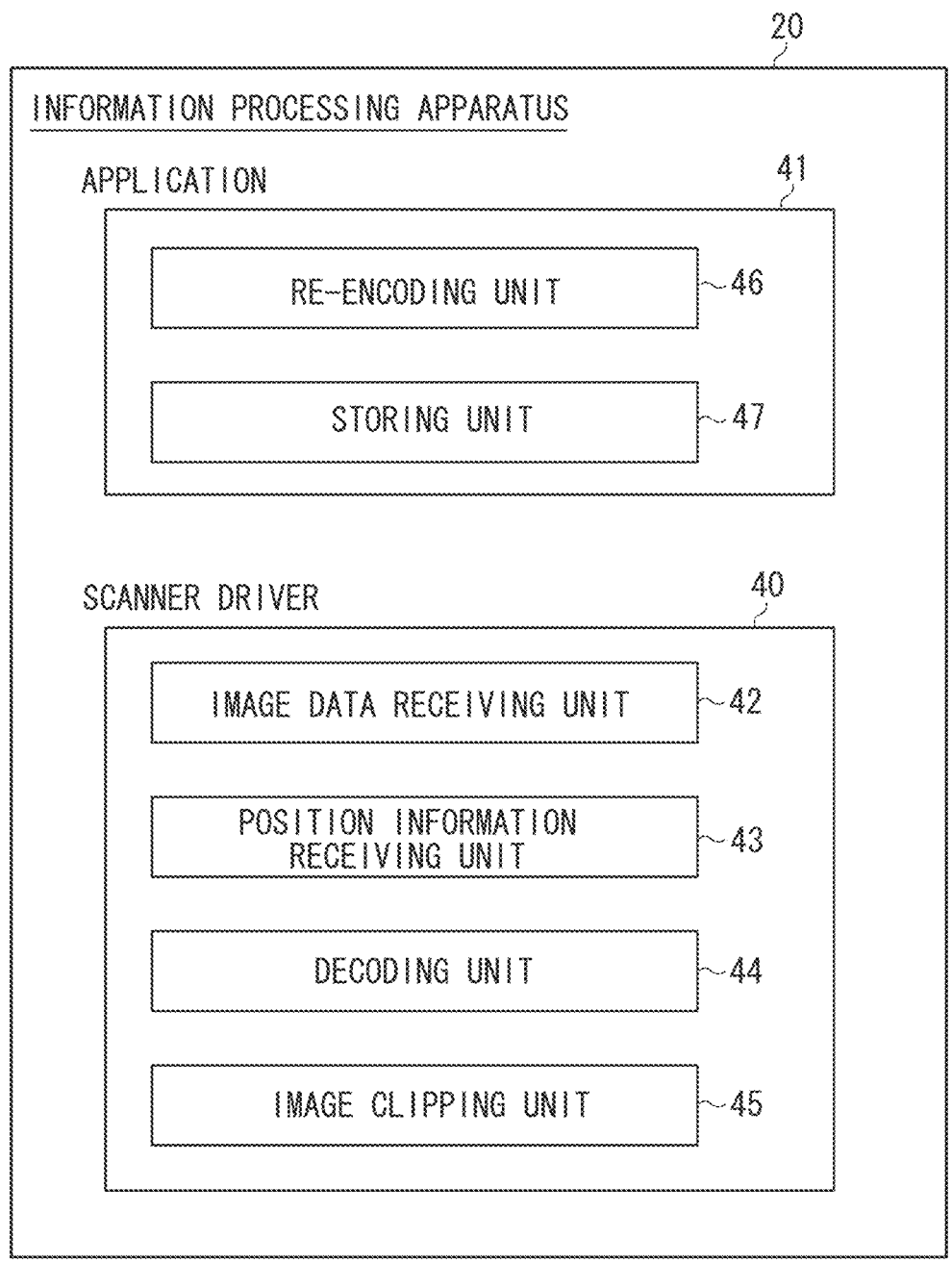
FIG. 3 illustrates units included in an information processing apparatus.

FIG. 3 illustrates units included in the information processing apparatus 20. Referring to FIG. 3, the information processing apparatus 20 includes a program (hereinafter referred to as a scanner driver 40) for controlling the image reading apparatus 10 and an application 41 which receives image data from the scanner driver 40. The scanner driver 40 includes an image data receiving unit 42, a position information receiving unit 43, a decoding unit 44, and an image clipping unit 45. The application 41 includes a re-encoding unit 46 and a storing unit 47. The image data receiving unit 42, the position information receiving unit 43, the decoding unit 44, and the image clipping unit 45 may be included in the application 41 instead of the scanner driver 40. Further, the re-encoding unit 46 and the storing unit 47 may be included in the scanner driver 40 instead of the application 41. The processes performed by the units included in the information processing apparatus 20 will be described in detail below with reference to the flowchart illustrated in FIG. 5.

The image reading apparatus may start the reading operation according to an instruction issued on the operation panel of the image reading apparatus.

FIG. 4 is a flowchart illustrating a process for the image reading apparatus 10 transferring image data obtained by reading the document to the information processing apparatus 20. The process of the flowchart illustrated in FIG. 4 is performed when the image reading apparatus 10 encodes front-and-back combined image data based on the image data of the front surface and the image data of the back surface.

In step S101, the image reading apparatus 10 determines whether the start positions in the main scanning direction of the image data of the front surface and the image data of the back surface that are respectively output from the front surface image reading sensor and the back surface image reading sensor are each at a position corresponding to an integer multiple of the coding block. More specifically, the determination is made as follow. The read front surface image data and the back surface image data are stored in a memory of the image reading apparatus 10. When the front-and-back combined image data is to be encoded from the stored front surface image data and the back surface image data, the image reading apparatus 10 determines whether the start positions of the front surface image data and the back surface image data are each at the position corresponding to an integer multiple of the coding block. Alternatively, the image reading apparatus 10 may determine whether the width of each of the image data corresponds to an integer multiple of the coding block.

If the image reading apparatus 10 determines that the start positions in the main scanning direction of the front surface image data and the back surface image data are not at the position corresponding to the integer multiple of the coding block, the image reading apparatus 10 performs as follows. The image reading apparatus 10 adjusts the start positions in the main scanning direction of the front surface image data and the back surface image data to be each at the position corresponding to the integer multiple of the coding block. As an example of the adjustment method, for example, if the width of the front surface image data does not correspond to the integer multiple of the coding block, the end edge of the front surface image data is interpolated by arbitrary data such as white data. By performing such interpolation, the start position in the main scanning direction of the back surface image data is adjusted to be at the position corresponding to the integer multiple of the coding block.

In step S102, the image reading apparatus 10 determines whether the start positions in the sub-scanning direction of the front surface image data and the back surface image data are each at the position corresponding to an integer multiple of the coding block. If the image reading apparatus 10 determines that the start positions in the sub-scanning direction of the front surface image data and the back surface image data are not at the position corresponding to the integer multiple of the coding block, the image reading apparatus 10 performs as follows. The image reading apparatus 10 adjusts the start positions in the sub-scanning direction of the front surface image data and the back surface image data to be each at the position corresponding to the integer multiple of the coding block. In the case of the sub-scanning direction, adjustment is performed by adding white data or the like to an upper end of the back surface image data. Further, the start positions in the sub-scanning direction may also be adjusted by, for example, adjusting a timing at which a read instruction signal is issued to the back surface image reading sensor in such a manner that the upper end of the back surface image data is at the position corresponding to the integer multiple of the coding block. For example, if the upper end of the back surface image data is shifted toward an upper side from the position corresponding to the integer multiple of the coding block, an issuance timing of the read instruction signal is delayed. As a result, the upper end of the back surface image data is adjusted to be at the position corresponding to the integer multiple of the coding block. In step S103, the image reading apparatus 10 causes the image data storage unit 32 to store the adjusted front surface image data and back surface image data in the memory. In step S104, the image reading apparatus 10 causes the encoding unit 33 to encode the front surface image data and the back surface image data adjusted in steps S101 and S102 as the front-and-back combined image data. In step S105, the image reading apparatus 10 causes the image data transfer unit 34 to transfer the encoded front-and-back combined image data to the information processing apparatus 20. In step S106, the image reading apparatus 10 causes the position information transfer unit 35 to transfer position information of the images to the information processing apparatus 20. The position information transmitted in step S106 includes the start positions and the end edge positions both in the main scanning direction and the sub-scanning direction of the front surface image data and the back surface image data. Alternatively, start positions, widths, and heights of the front surface image data and the back surface image data may be transmitted in step S106. The image reading apparatus 10 then reads a subsequent document in parallel with the transmission processes of steps S105 and S106.

According to the present exemplary embodiment, the processing order in the flowchart may be changed, and it is also not necessary to perform all of the processes, as long as the issue of the present invention can be solved. Further, it is only necessary to adjust the start position of at least one of the front surface image data and the back side image data as required. Furthermore, according to the process of the flowchart illustrated in FIG. 4, the start position is adjusted by performing interpolation using white data or the like, as an example. However, the adjustment method is not limited thereto, and when the front surface image data and the back surface image data are written in the memory, a writing timing may be adjusted in such a manner that writing of the image data is started from the position corresponding to the integer multiple of the coding block.

FIG. 5 is a flowchart illustrating a process performed by the information processing apparatus 20.

In step S201, the scanner driver 40 of the information processing apparatus 20 receives the encoded front-and-back combined image data from the image reading apparatus 10 via the image data reading unit 42. In step S202, the scanner driver 40 receives the position information of the images from the image reading apparatus 10 via the position information receiving unit 43. In step S203, the scanner driver 40 causes the decoding unit 44 to decode the encoded front-and-back combined image data, and in step S204, causes the image clipping unit 45 to separate the decoded front-and-back combined image data into the front surface image data and the back surface image data based on the position information of the images. In step S205, the application 41 of the information processing apparatus 20 causes the re-encoding unit 46 to encode each of the separated front surface image data and the back surface image data, and in step S206, causes the storing unit 47 to store the encoded front surface image data and back surface image data. In the flowchart illustrated in FIG. 5, each of the front surface image data and the back surface image data is encoded in step S205 and then stored in step S206. However, the re-encoding process performed in step S205 and the storing of the image data performed in step S206 are not essential.

Figure 6A:
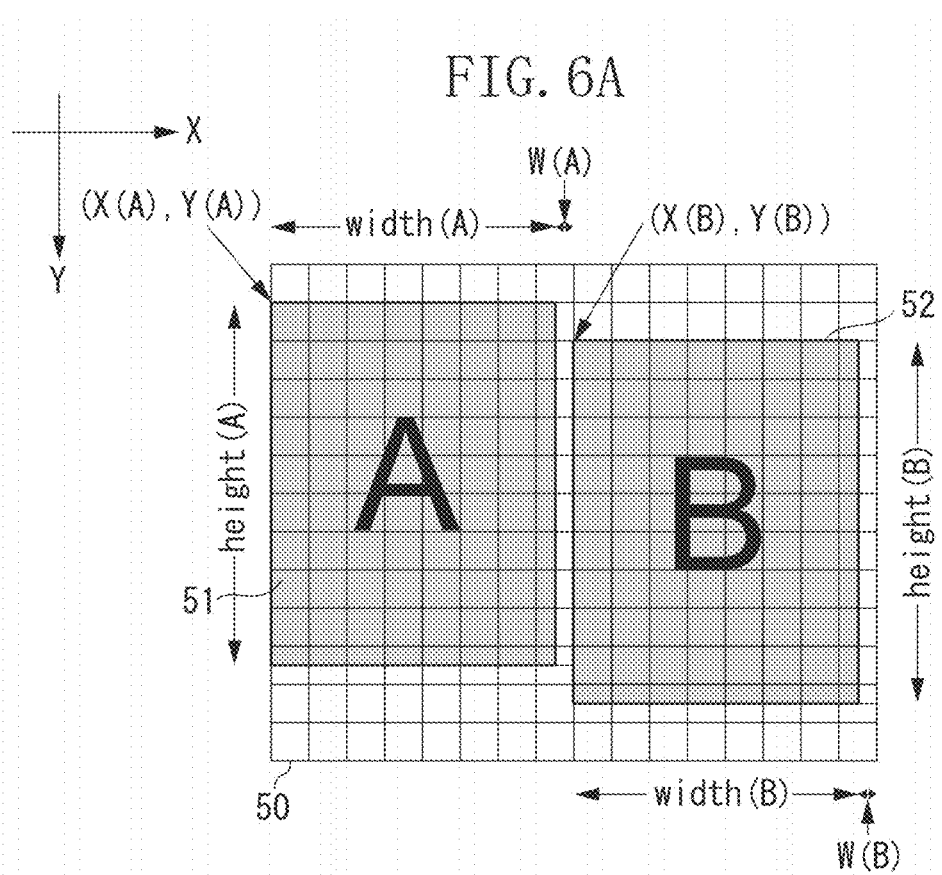
FIGS. 6A and 6B illustrate encoded front-and-back combined image data according to a first exemplary embodiment.
Figure 6B:
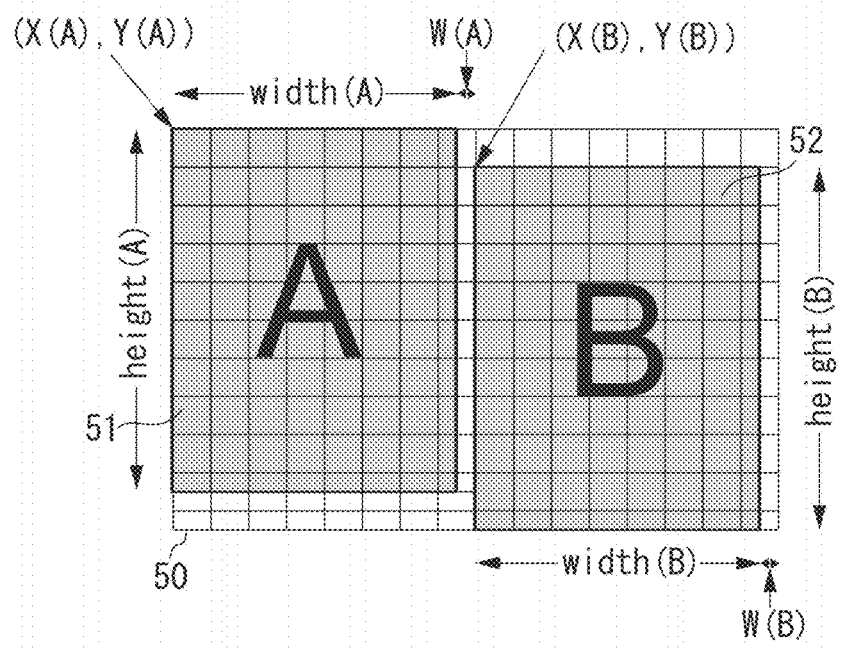

FIG. 6A illustrates an example of the front-and-back combined image data encoded by Joint Photographic Experts Group (JPEG) encoding, generated by the image reading apparatus 10. Referring to FIG. 6A, a front surface A 51 and a back surface B 52 are generated as one JPEG image 50. According to the present exemplary embodiment, JPEG encoding is described as an example of the encoding method. However, the encoding method is not limited thereto, and other encoding methods may also be used. According to the first exemplary embodiment, the information processing apparatus 20 designates a size in which the width is width (A) and the height is height (A), and the image reading apparatus 10 reads the document corresponding to the designated size. In FIG. 6A, (X (A), Y (A)) indicates the start position of the front surface A 51, width (A) indicates the width of the front surface A 51, and height (A) indicates the height of the front surface A 51. Further, (X (B), Y (B)) indicates the start position of the back surface B 52, width (B) indicates the width of the back surface B 52, and height (B) indicates the height of the back surface B 52. Furthermore, W (A) is the width of an area by which the image of the front surface A 51 in the main scanning direction has been interpolated in such a manner that the start position X (B) in the main scanning direction of the back surface B 52 overlaps with a boundary of the JPEG block. Moreover, the image data of the back surface B 52 is arranged in such a manner that the start position Y (B) in the sub-scanning direction of the back surface B 52 overlaps with the boundary of the JPEG block. The start position of the image data is arranged so as to overlap with the start position of the JPEG block in this way, for the purpose of reducing image deterioration when the information processing apparatus 20 decodes and separates the encoded front-and-back combined image data, and then re-encodes the data. In FIG. 6A, the image of the back surface B 52 is shifted backward in the sub-scanning direction as compared to the image of the front surface A 51 for the following reason. The front surface image reading sensor and the back surface image sensor of the image reading apparatus 10 are arranged to be shifted from each other to prevent interference between the image reading sensors. According to the present exemplary embodiment, the image of the back surface B 52 is shifted backward. However, it is not limited thereto, and the image of the front surface A 51 may be shifted backward, or the present invention can be applied to a case where there is no shift between the front surface A 51 and the back surface B 52. Further, in FIG. 6A, there are blank spaces above and below the front surface A 51 and the back surface B 52. However, it is not limited thereto, and there may be no blank spaces as illustrated in FIG. 6B. The blank spaces are similarly unnecessary in corresponding drawings other than FIGS. 6A and 6B, and it is more desirable not to have such blank spaces for reducing an amount of data to be transferred to the information processing apparatus. Furthermore, if (X (A), Y (A)) and (X (B), Y (B)) are values specific to a device model, the information processing apparatus 20 may clip the data using the values specific to the device model without such information being transmitted to the information processing apparatus 20. Moreover, the information processing apparatus 20 may clip the data based on a designated reading size without information on width (A), height (A), width (B), and height (B) being transmitted to the information processing apparatus 20.

FIG. 7 is a flowchart illustrating a process performed by the information processing apparatus 20 for separating the front-and-back combined image data 50 as illustrated in FIG. 6A. In step S301, the scanner driver 40 decodes the encoded front-and-back combined image data 50. In steps S302 and S303, the scanner driver 40 respectively clips the front surface image (based on X (A), Y (A), width (A), and height (A)) and the back surface image (based on X (B), Y (B), width (B), and height (B)). In steps S304 and S305, the application 41 respectively encodes the clipped front surface image data and back surface image data. In the process of the flowchart illustrated in FIG. 7, the front surface image and the back surface image are sequentially clipped and encoded. However, the front surface image and the back surface image may be clipped and encoded in parallel.

Figure 8:
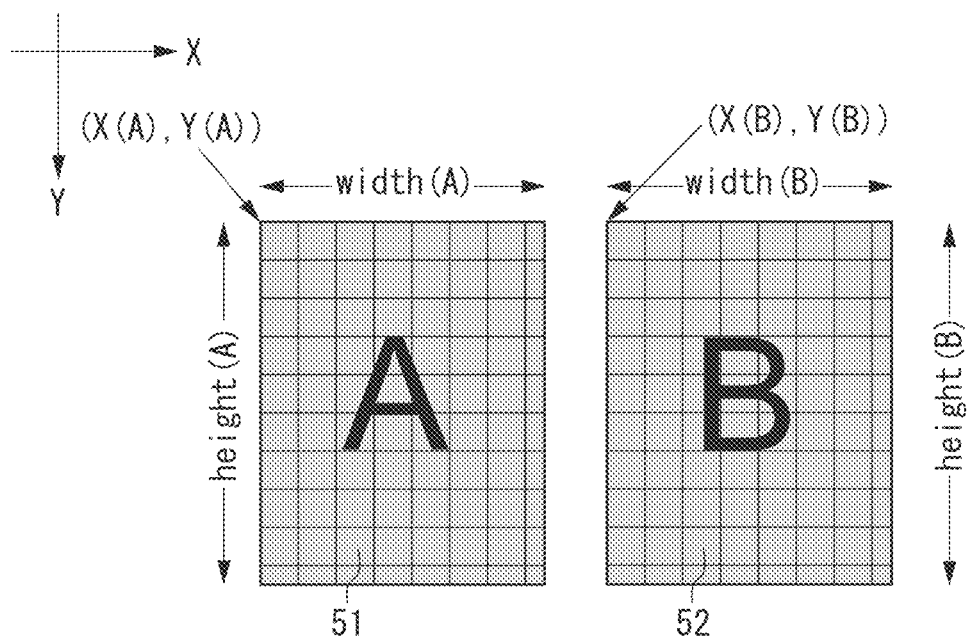
FIG. 8 illustrates image data obtained by separating the front-and-back combined image data according to the first exemplary embodiment.

FIG. 8 illustrates image data obtained by the information processing apparatus 20 decoding and separating the encoded front-and-back combined image data 50 illustrated in FIG. 6A. Referring to FIG. 8, the front surface A 51 is clipped to have width (A) and height (A), and the back surface B 52 is clipped to have width (B) and height (B). (X (A), Y (A)) indicates the start position of the front surface A 51, and (X (B), Y (B)) indicates the start position of the back surface 52. Each of the start positions is at a coordinate position overlapping with the boundary of the coding block. By arranging the start positions of the image data to overlap with the boundary of the coding block as described above, the image deterioration can be reduced when the information processing apparatus re-encodes the data into JPEG data or the like. If the start position of the image data does not correspond to the boundary of the coding block and is positioned, for example, at a center of the coding block, when the image reading apparatus 10 performs encoding, the deterioration due to noise in a block portion becomes large. Further, the information processing apparatus 20 separates the image data based on the position information transmitted from the image reading apparatus 10. As a result, the front surface image data and the back surface image data can be obtained without including the portion where no image is arranged (e.g., the area corresponding to W (A) illustrated in FIG. 6A) that had been included in the front-and-back combined image data.

Figure 9:
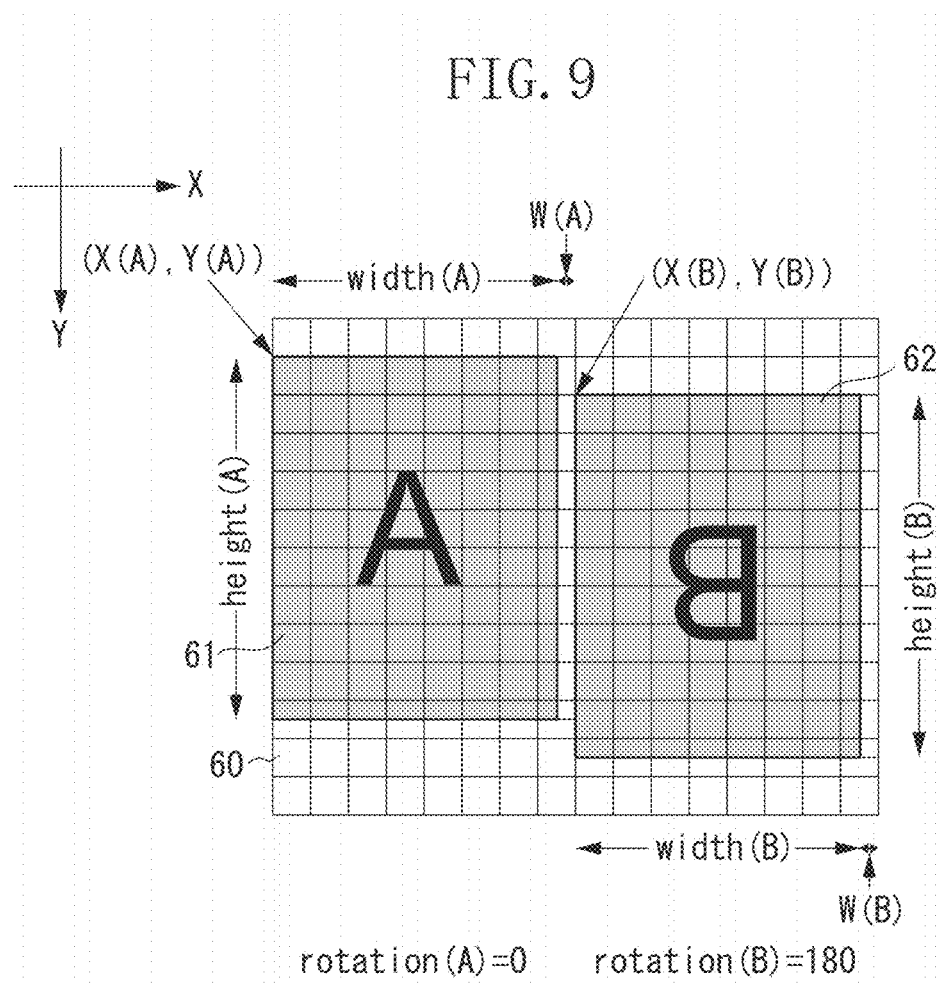
FIG. 9 illustrates encoded front-and-back combined image data according to the first exemplary embodiment.

FIG. 9 illustrates an example in which a back surface B 62 is rotated by 180 degrees. In such a case, rotation information of the front surface, i.e., rotation (A), and rotation information of the back surface, i.e., rotation (B), are transmitted to the information processing apparatus 20 along with the start positions, the widths, and the heights of the images illustrated in FIG. 6A. The information processing apparatus 20 then rotates the image based on the rotation information.

Figure 10:
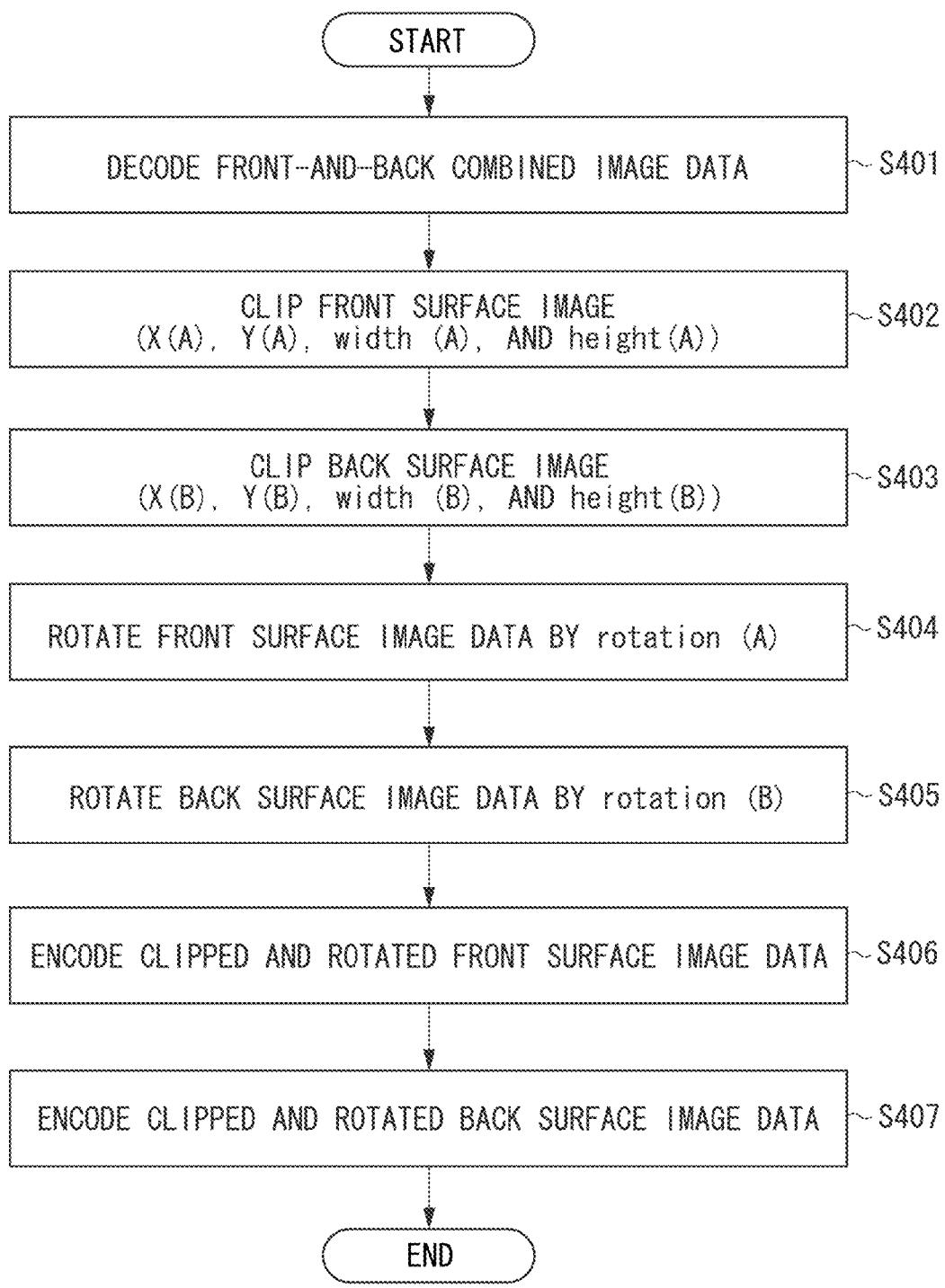
FIG. 10 is a flowchart illustrating a process for separating the front-and-back combined image data according to the first exemplary embodiment
Figure 11:
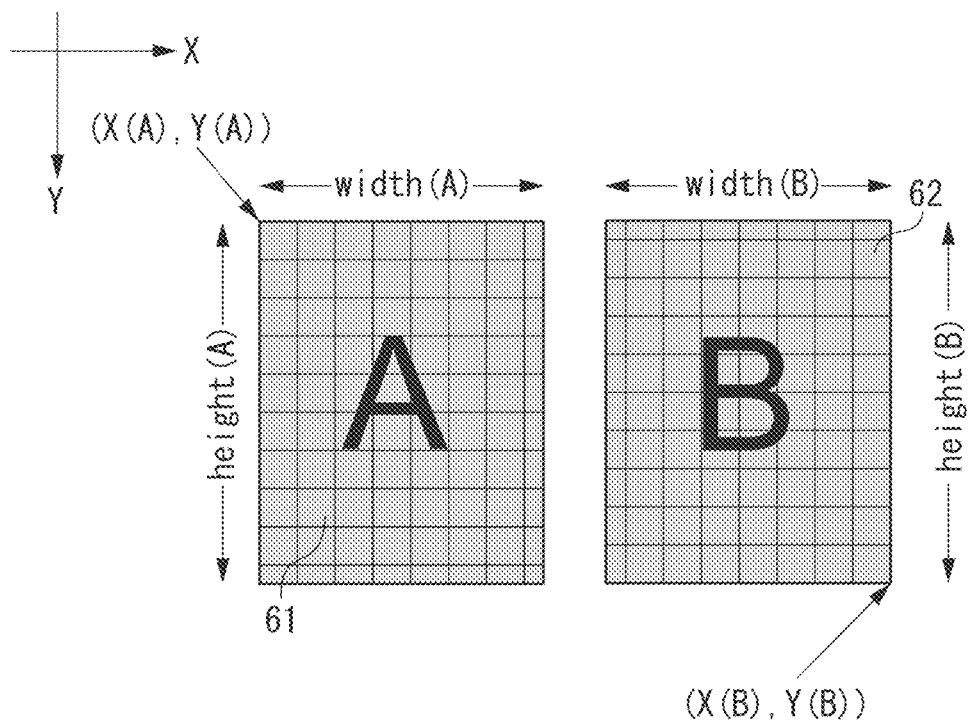
FIG. 11 illustrates image data obtained by separating the front-and-back combined image data according to the first exemplary embodiment.

FIG. 10 is a flowchart illustrating a process performed by the information processing apparatus 20 for separating front-and-back combined image data 60 as illustrated in FIG. 9. Since the processes of steps S401 to S403 are similar to those of steps S301 to S303 of the flowchart illustrated in FIG. 7, detailed description will be omitted. In step S404, the scanner driver 40 rotates the clipped front surface image data by rotation (A). In step S405, the scanner driver 40 rotates the clipped back surface image data by rotation (B). In step S406, the application 41 encodes the clipped front surface image data, and in step S407, the application 41 encodes the clipped back surface image data. In the process of the flowchart illustrated in FIG. 10, the front surface image and the back surface image are sequentially clipped, rotated, and encoded. However, the front surface image and the back surface image may be clipped, rotated, and encoded in parallel. FIG. 11 illustrates a result of clipping the front-and-back combined image data 60 illustrated in FIG. 9 as the front surface 61 and the back surface 62 by performing the process of the flowchart illustrated in FIG. 10.

According to the present exemplary embodiment, the image reading apparatus 10 adjusts the start positions of the front surface image data and the back surface image data in the main scanning direction and the sub-scanning direction to be at the position corresponding to the integer multiple of the coding block. As a result, for example, the image deterioration is reduced when the information processing apparatus re-encodes the data transmitted from the image reading apparatus. Further, the information processing apparatus performs the separation using the position information, so that the portion where no image is arranged is not included in the separated data. Consequently, if printing is performed using the separated front surface image data, for example, a blank portion unintended by the user is not printed, so that printing according to the user's intention is realized.

Figure 12:
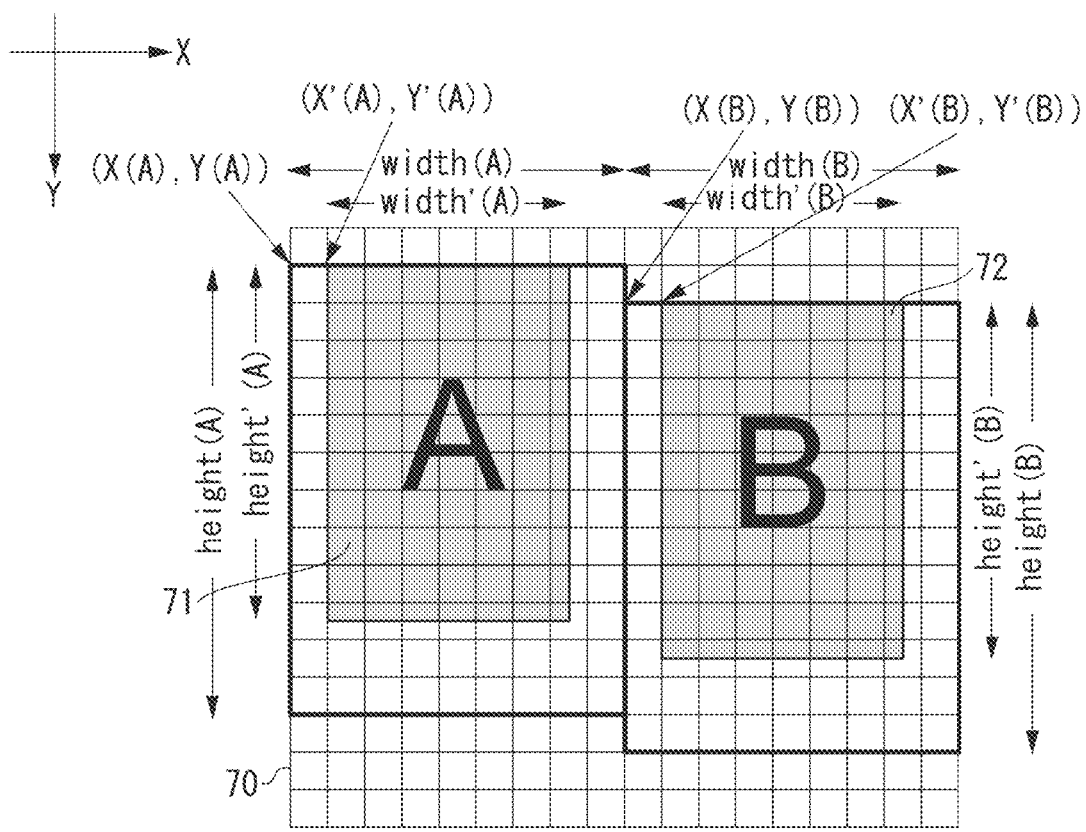
FIG. 12 illustrates encoded front-and-back combined image data according to a second exemplary embodiment.

FIG. 12 illustrates JPEG-encoded front-and-back combined image data 70 generated by the image reading apparatus 10. According to a second exemplary embodiment, the image reading apparatus 10 reads the document in an automatic mode without receiving designation of the document size. In the automatic mode, the image reading apparatus 10 reads the document at a maximum readable size and transfers the obtained image data to the information processing apparatus 20. The information processing apparatus 20 then clips the images from the transferred image data. If the automatic mode is designated in the image reading apparatus 10 including a main scanning direction sensor and a sub-scanning direction sensor for detecting the document size, the image reading apparatus 10 can clip the front surface image data and the back surface image data according to an actual document size. However, an overhead of such a clipping process is large, so in a case where a document of a plurality of sheets is to be read such as the case of using an automatic document feeder (ADF), a reading time becomes delayed. For this reason, a processing time would be shortened by the information processing apparatus 20 clipping the images instead of the image reading apparatus 10.

FIG. 12 illustrates the encoded front-and-back combined image data 70, read by the image reading apparatus 10 in the automatic mode. Referring to FIG. 12, the encoded front-and-back combined image data 70 is read according to Letter width (A) and width (B) at maximum in the main scanning direction, and according to Legal height (A) and height (B) at maximum in the sub-scanning direction. According to the present exemplary embodiment, width (A) and width (B) corresponding to the Letter width (A) and height (A) and height (B) corresponding to the Legal height (A) are only examples and the present invention is not limited thereto as long as the image reading apparatus 10 reads the data according to the values larger than the actual document size. (X (A), Y (A)) indicates the start position of the image data of a front surface A 71 and (X (B), Y (B)) indicates the start position of the image data of a back surface B 72. These start positions are based on the size having the Letter width and the Legal height. (X' (A), Y' (A)) indicates the start position of the front surface A 71 in the actual document and (X' (B), Y' (B)) indicates the start position of the back surface B 72 in the actual document. The image reading apparatus 10 performs adjustment in such a manner that these start positions (X' (A), Y' (A)) and (X' (B), Y' (B)) in the actual document overlap with the boundary of the coding block. By performing adjustment in this way, the image deterioration is reduced when the information processing apparatus 20 performs re-encoding. Width' (A) indicates the width of the front surface A 71 in the actual document and height' (A) indicates the height of the front surface A 71 in the actual document. On the other hand, width' (B) indicates the width of the back surface B 72 in the actual document and height' (B) indicates the height of the back surface B 72 in the actual document. The information processing apparatus 20 clips the front surface image data and the back surface image data based on the above-described information.

Figure 13:
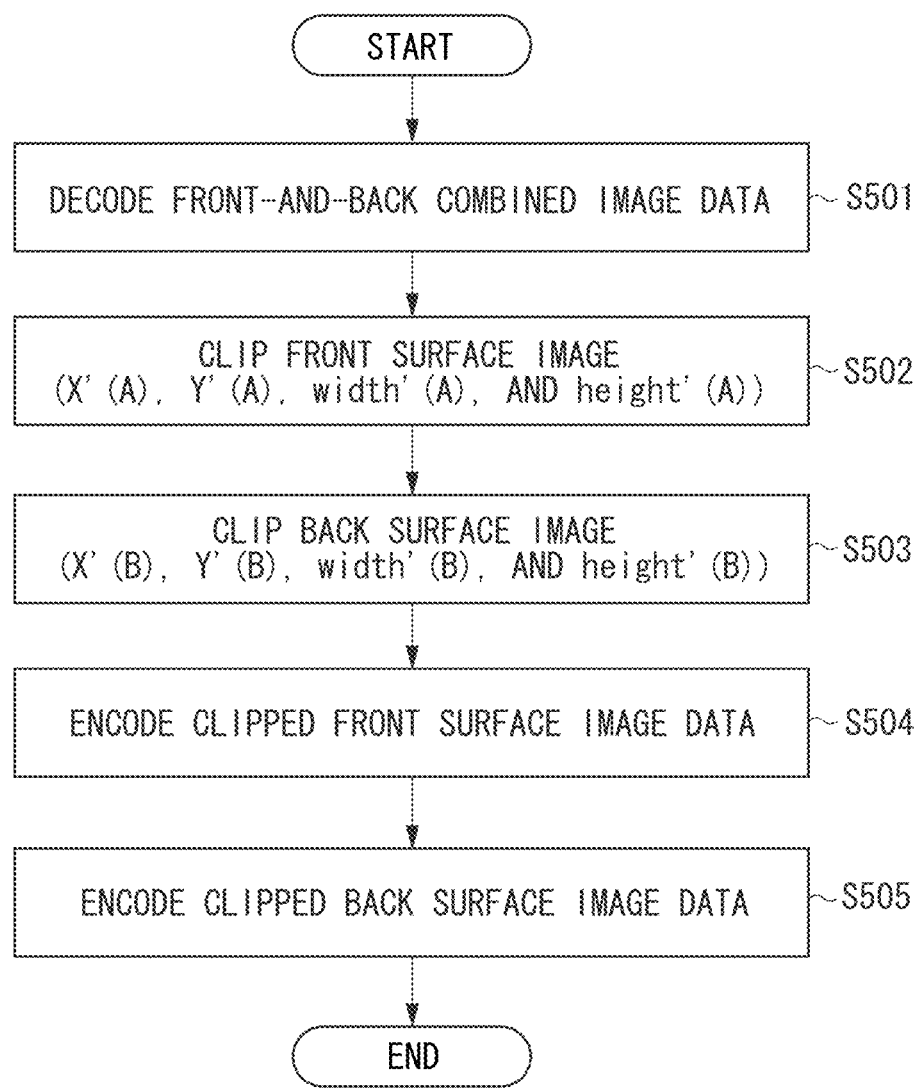
FIG. 13 is a flowchart illustrating a process for separating the front-and-back combined image data according to the second exemplary embodiment.
Figure 14:
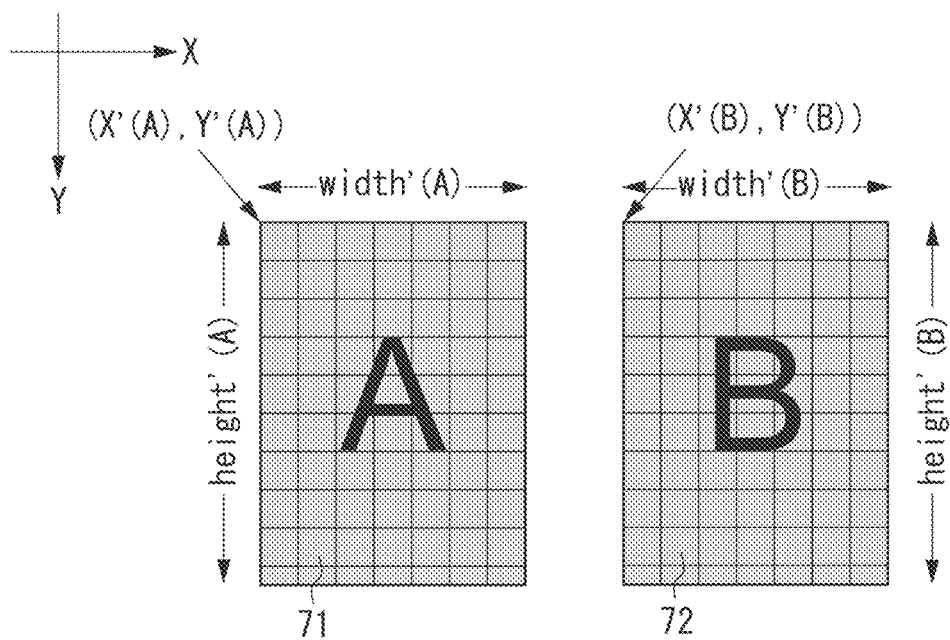
FIG. 14 illustrates image data obtained by separating the front-and-back combined image data according to the second exemplary embodiment.

FIG. 13 is a flowchart illustrating a process performed by the information processing apparatus 20 for clipping the front-and-back combined image data 70 illustrated in FIG. 12. In step S501, the scanner driver 40 decodes the encoded front-and-back combined image data 70. In step S502, the scanner driver 40 clips the front surface image (based on X' (A), Y' (A), width' (A), and height' (A)). In step S503, the scanner driver 40 clips the back surface image (based on X' (B), Y' (B), width' (B), and height' (B)). In step S504, the application 41 encodes the clipped front surface image data, and in step S505, the application 41 encodes the clipped back surface image data. FIG. 14 illustrates the result of clipping the image data 70 illustrated in FIG. 11 as the front surface 71 and the back surface 72 by performing the process of the flowchart illustrated in FIG. 13.

There is a type of the image reading apparatus 10 which only includes the sub-scanning direction sensor for detecting the document size and do not include the main scanning direction sensor for detecting the document size in the main scanning direction.

Figure 15:
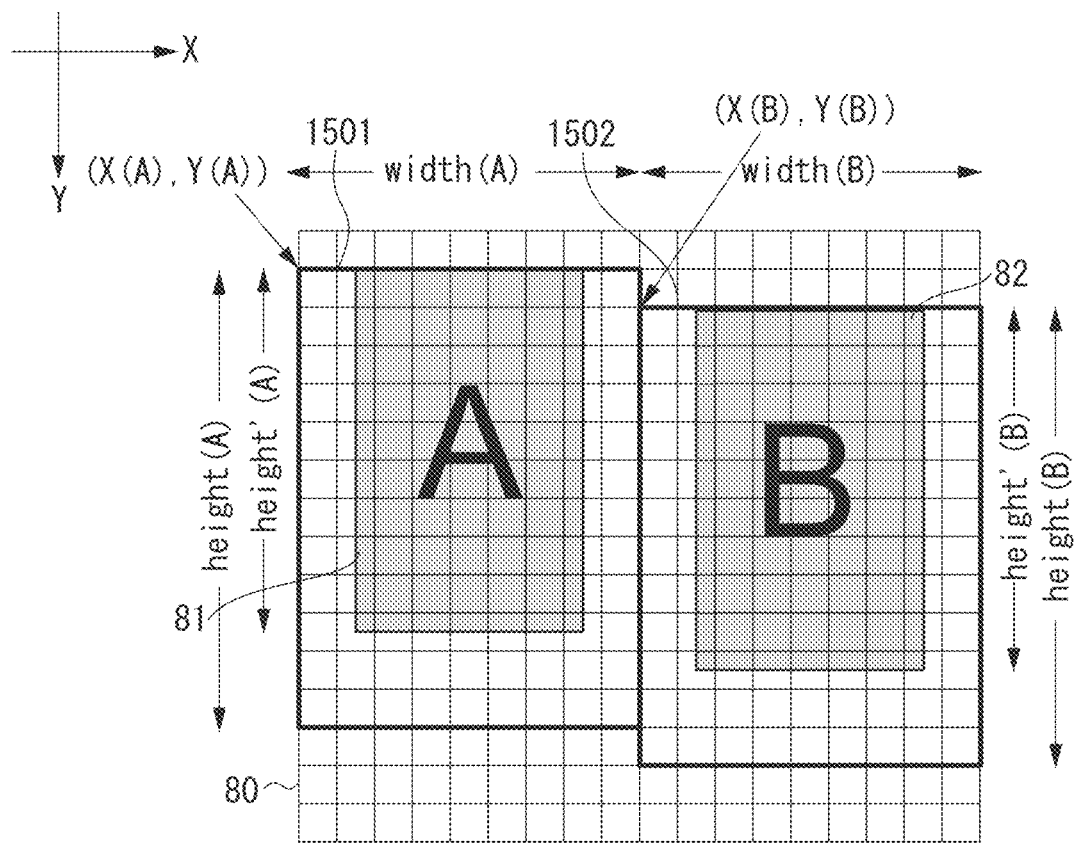
FIG. 15 illustrates encoded front-and-back combined image data according to the second exemplary embodiment.

FIG. 15 illustrates front-and-back combined image data obtained in the automatic mode in the case where there is no main scanning direction sensor. In such a case, due to absence of the main scanning direction sensor, the image reading apparatus cannot recognize the start positions X' (A) and X' (B) and the widths width' (A) and width' (B) in the main scanning direction. Naturally, the information processing apparatus is also unable to recognize such values. The information processing apparatus 20 thus estimates width' (A) and width' (B) from height' (A) and height' (B) respectively. In other words, if the information processing apparatus 20 has the information on the height, the width in the main scanning direction can be estimated by applying the information to a standard size of the document. The image is then clipped based on the estimated width. The above-described estimation process may also be performed by the image reading apparatus 10 estimating the width from the height. In such a case, the image reading apparatus 10 transmits the estimated width information to the information processing apparatus 20, and the information processing apparatus 20 performs separation based on the information. The information processing apparatus 20 then estimates the start positions X' (A) and X' (B) in the main scanning direction from the estimated width' (A) and width' (B). For example, X' (A) is estimated to be a value closest to a position corresponding to an integer multiple of the coding block from a value obtained by calculating (X (A)+(width (A)−width'(A))/2). Further, X' (B) is estimated to be a value closest to a position corresponding to an integer multiple of a JPEG block from a value obtained by calculating (X (B)+(width (B)−width'(B))/2). In the example illustrated in FIG. 15, X' (A) is 1501, and X' (B) is 1502. According to the present exemplary embodiment, X' (A) and X' (B) are adjusted to be each at the position corresponding to the integer multiple of the coding block with a view to reducing the deterioration when the information processing apparatus 20 performs re-encoding. If the information processing apparatus 20 is not to perform re-encoding, for example, the deterioration does not occur during re-encoding. In such a case, for example, the value obtained by calculating (X (A)+(width (A)−width'(A))/2) may be directly used as X' (A) and the value obtained by calculating (X (B)+(width (B)−width'(B))/2) as X' (B).

The method for estimating X' (A) and X' (B) is only an example and other methods may be used.

Figure 16:
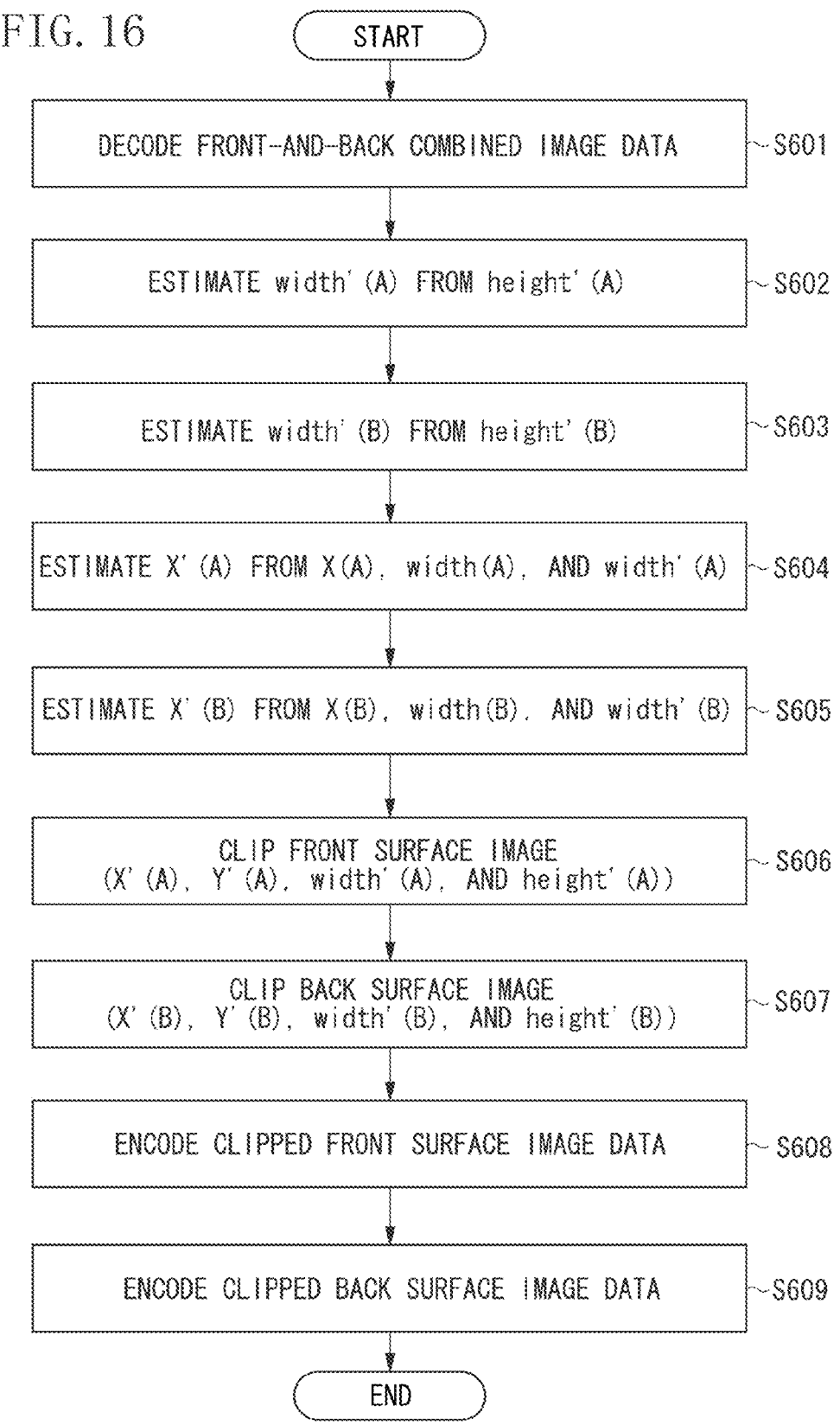
FIG. 16 is a flowchart illustrating a process for separating the front-and-back combined image data according to the second exemplary embodiment.
Figure 17:
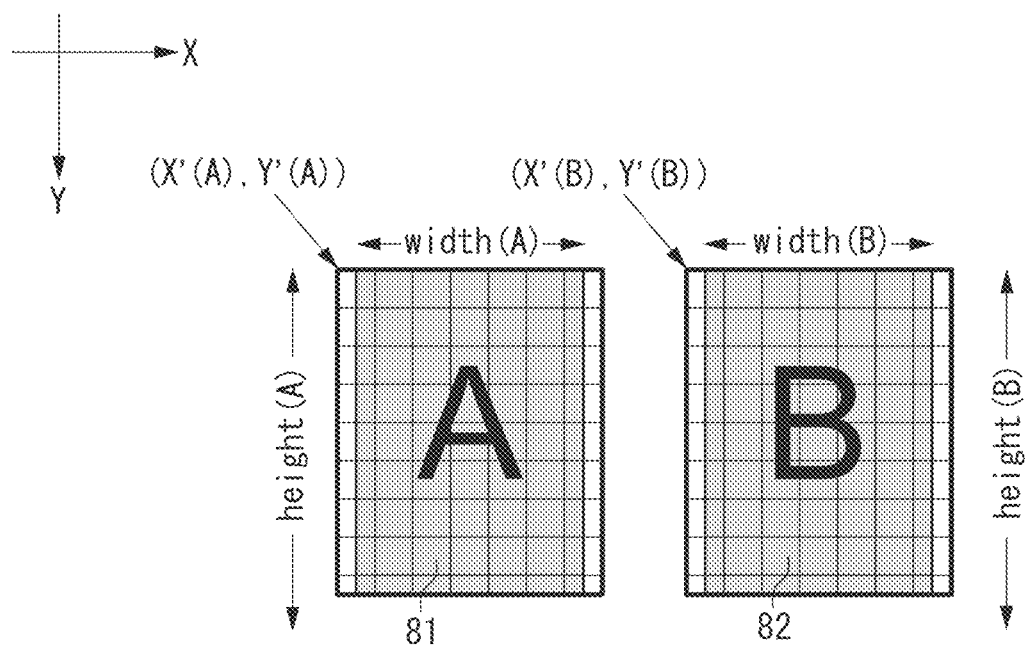
FIG. 17 illustrates image data obtained by separating the front-and-back combined image data according to the second exemplary embodiment.

FIG. 16 is a flowchart illustrating a process performed by the information processing apparatus 20 for clipping front-and-back combined image data 80 illustrated in FIG. 15. In step S601, the scanner driver 40 decodes the front-and-back combined image data 80. In step S602, the scanner driver 40 estimates width' (A) from height' (A). In step S603, the scanner driver 40 estimates width' (B) from height' (B). In step S604, the scanner driver 40 estimates X' (A) from X (A), width (A), and width' (A), and in step S605, the scanner driver 40 estimates X' (B) from X (B), width (B), and width' (B). In step S606, the scanner driver 40 clips the front surface image (based on X' (A), Y' (A), width' (A), and height' (A)), and in step S607, the scanner driver 40 clips the back surface image (based on X' (B), Y' (B), width' (B), and height' (B)). In step S608, the application 41 encodes the clipped front surface image data, and in step S609, the application 41 encodes the clipped back surface image data. FIG. 17 illustrates the result of clipping the front-and-back combined image data 80 as image data of a front surface 81 and image data of a back surface 82 by performing the process of the flowchart illustrated in FIG. 16.

According to the above-described exemplary embodiments, the image reading apparatus 10 is described as an example of a device controlled by the computer 20. However, it is not limited thereto, and the computer 20 may control other devices such as a facsimile.

The present invention may also be realized by supplying software (a program) for implementing the functions of the above-described exemplary embodiments to a system or an apparatus via a network or various types of storage medium and a computer (or a CPU or a micro-processing unit (MPU)) of the system or the apparatus reading and executing the program. Further, the program may be executed by one computer, or by a plurality of computers collaborating with each other. Furthermore, the processes described in the exemplary embodiments may be performed by providing hardware such as a circuit for executing a portion of the program, and by the hardware and the computer executing the software collaborating with each other.

According to an exemplary embodiment of the present invention, front surface image data and back surface image data can be appropriately separated from front-and-back combined image data.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-079004 filed Apr. 7, 2014, which is hereby incorporated by reference herein in its entirety.

What is claimed is:

1. An image reading apparatus having a front surface reading unit configured to read a front surface of a document and a back surface reading unit configured to read a back surface of the document, the image reading apparatus comprising:
a memory;
a processor coupled to the memory which executes the following:
obtaining image data of the front surface of the document by using the front surface reading unit and image data of the back surface of the document by using the back surface reading unit;
determining whether a start position of the obtained image data of the back surface is at a position corresponding to an integer multiple of a coding block;
generating, as adjustment processing, an area between an end edge position of the image data of the front surface and a start position of the image data of the back surface in such a manner that a start position of the image data of the back surface is at a position corresponding to an integer multiple of a coding block, if it is determined that a start position of the image data of the back surface is not at a position corresponding to an integer multiple of a coding block;
encoding front-and-back combined image data that is based on the image data of the front surface, the area and the image data of the back surface; and
transmitting the encoded front-and-back combined image data, first information indicating an area of the image data of the front surface in the front-and-back combined image data, and second information indicating an area of the image data of the back surface in the front-and-back combined image data,
wherein the first information includes front surface position information indicating an end edge position of the image data of the front surface that is a start position of the back surface prior to the adjustment processing, and
wherein the front surface position information included in the first information indicates a position which is not corresponding to the integer multiple of the coding block.

2. The image reading apparatus according to claim 1, further comprising performing adjustment in such a manner that start positions in a sub-scanning direction and start positions in a main scanning direction of the image data of the front surface and the image data of the back surface are each at a position corresponding to an integer multiple of a coding block.

3. The image reading apparatus according to claim 2, further comprising interpolating arbitrary data at an end edge position of the image data of the front surface in the main scanning direction in such a manner that a start position of the image data of the back surface in the main scanning direction is at a position corresponding to an integer multiple of a coding block, and interpolates arbitrary data at an upper end of the image data of the back surface in such a manner that a start position of the image data of the back surface in the sub-scanning direction is at a position corresponding to an integer multiple of a coding block.

4. The image reading apparatus according to claim 1, wherein the front surface reading unit and the back surface reading unit perform reading processing of a subsequent document while transmitting the encoded front-and-back combined image data, the first information, and the second information.

5. The image reading apparatus according to claim 1, wherein the first information and the second information include a start position, an end edge position in a main scanning direction, and an end edge position in a sub-scanning direction of the image data.

6. A control method executed in an image reading apparatus having a front surface reading unit configured to read a front surface of a document and a back surface reading unit configured to read a back surface of the document, the control method comprising:
obtaining image data of the front surface of the document by using the front surface reading unit and image data of the back surface of the document by using the back surface reading unit;
determining whether a start position of the obtained image data of the back surface is at a position corresponding to an integer multiple of a coding block;
generating, as adjustment processing, an area between an end edge position of the image data of the front surface and a start position of the image data of the back surface in such a manner that a start position of the image data of the back surface is at a position corresponding to an integer multiple of a coding block, if it is determined that a start position of the image data of the back surface is not at a position corresponding to an integer multiple of a coding block;
encoding front-and-back combined image data that is based on the image data of the front surface, the area and the adjusted image data of the back surface; and
transmitting the encoded front-and-back combined image data, first information indicating an area of the image data of the front surface in the front-and-back combined image data, and second information indicating an area of the image data of the back surface in the front-and-back combined image data,
wherein the first information includes front surface position information indicating an end edge position of the image data of the front surface that is a start position of the back surface prior to the adjustment processing, and the front surface position information indicating a position which is not corresponding to the integer multiple of the coding block.

7. The control method according to claim 6, wherein adjustment is performed in such a manner that start positions in a sub-scanning direction and start positions in a main scanning direction of the image data of the front surface and the image data of the back surface are each at a position corresponding to an integer multiple of a coding block.

8. The control method according to claim 7, wherein arbitrary data is interpolated at an end edge position of the image data of the front surface in the main scanning direction in such a manner that a start position of the image data of the back surface in the main scanning direction is at a position corresponding to an integer multiple of a coding block, and arbitrary data is interpolated at an upper end of the image data of the back surface in such a manner that a start position of the image data of the back surface in the sub-scanning direction is at a position corresponding to an integer multiple of a coding block.

9. The control method according to claim 7, wherein the front surface reading unit and the back surface reading unit perform reading processing of a subsequent document while the encoded front-and-back combined image data, the first information, and the second information being transmitted.

10. The control method according to claim 7, wherein the first information and the second information include a start position, an end edge position in a main scanning direction, and an end edge position in a sub-scanning direction of the image data.

11. A non-transitory computer-readable storage medium storing a program executed in an image reading apparatus having a front surface reading unit configured to read a front surface of a document and a back surface reading unit configured to read a back surface of the document, the program for causing a computer to execute a control method comprising:
obtaining image data of the front surface of the document by using the front surface reading unit and image data of the back surface of the document by using the back surface reading unit;
determining whether a start position of the obtained image data of the back surface is at a position corresponding to an integer multiple of a coding block;
generating, as adjustment processing, an area between an end edge position of the image data of the front surface and a start position of the image data of the back surface in such a manner that a start position of the image data of the back surface is at a position corresponding to an integer multiple of a coding block, if it is determined that a start position of the image data of the back surface is not at a position corresponding to an integer multiple of a coding block;
encoding front-and-back combined image data that is based on the image data of the front surface, the area and the adjusted image data of the back surface; and
transmitting the encoded front-and-back combined image data, first information indicating an area of the image data of the front surface in the front-and-back combined image data, and second information indicating an area of the image data of the back surface in the front-and-back combined image data,
wherein the first information includes front surface position information indicating an end edge position of the image data of the front surface that is a start position of the back surface prior to the adjustment processing, and the front surface position information indicating a position which is not corresponding to the integer multiple of the coding block.

12. The non-transitory storage medium according to claim 11, wherein adjustment is performed in such a manner that start positions in a sub-scanning direction and start positions in a main scanning direction of the image data of the front surface and the image data of the back surface are each at a position corresponding to an integer multiple of a coding block.

13. The non-transitory storage medium according to claim 12, wherein arbitrary data is interpolated at an end edge position of the image data of the front surface in the main scanning direction in such a manner that a start position of the image data of the back surface in the main scanning direction is at a position corresponding to an integer multiple of a coding block, and arbitrary data is interpolated at an upper end of the image data of the back surface in such a manner that a start position of the image data of the back surface in the sub-scanning direction is at a position corresponding to an integer multiple of a coding block.

14. The non-transitory storage medium according to claim 11, wherein the front surface reading unit and the back surface reading unit perform reading processing of a subsequent document while the encoded front-and-back combined image data, the first information, and the second information being transmitted.

15. The non-transitory storage medium according to claim 11, wherein the first information and the second information include a start position, an end edge position in a main scanning direction, and an end edge position in a sub-scanning direction of the image data.

16. A system including an image reading apparatus having a front surface reading unit configured to read a front surface of a document and a back surface reading unit configured to read a back surface of the document, the system comprising:
   a memory;
   a processor coupled to the memory which executes the following:
   obtaining image data of the front surface of the document by using the front surface reading unit and image data of the back surface of the document by using the back surface reading unit;
   determining whether a start position of the obtained image data of the back surface is at a position corresponding to an integer multiple of a coding block;
   generating, as adjustment processing, an area between an end edge position of the image data of the front surface and a start position of the image data of the back surface in such a manner that a start position of the image data of the back surface is at a position corresponding to an integer multiple of a coding block, if it is determined that a start position of the image data of the back surface is not at a position corresponding to an integer multiple of a coding block;
   encoding front-and-back combined image data that is based on the image data of the front surface, the area and the image data of the back surface;
   transmitting the encoded front-and-back combined image data, first information indicating an area of the image data of the front surface in the front-and-back combined image data, and second information indicating an area of the image data of the back surface in the front-and-back combined image data;
   decoding the encoded front-and-back combined image data; and
   separating, using the first position information and the second position information, the decoded front-and-back combined image data into image data of the front surface and image data of the back surface,
   wherein the first information includes front surface position information indicating an end edge position of the image data of the front surface that is a start position of the back surface prior to the adjustment processing, and the front surface position information indicating a position which is not corresponding to the integer multiple of the coding block.

* * * * *